Patented July 19, 1938

2,124,237

UNITED STATES PATENT OFFICE 2,124,237

PROCESS FOR PRODUCING CONDENSATION PRODUCTS OF THE ANTHRAQUINONE SERIES

Heinz Scheyer, Frankfort-on-the-Main, and Emil Schwamberger, Frankfort-on-the-Main-Fechenheim, Germany, assignors to General Aniline Works, Inc., New York, N. Y., a corporation of Delaware No Drawing. Application May 6, 1936, Serial No. 78,224. In Germany May 16, 1935

1 Claim. (Cl. 260—60)

Our invention relates to a process for producing condensation products of the anthraquinone series. The new process comprises acting in any organic solvent and in the presence of strong alkaline acting condensing agents with primary aromatic amines on 1:2-benzanthrene-7,12-dione.

As primary aromatic amines those of the benzene, naphthalene, and anthraquinone series, which may contain besides the amino-group further substituents, are suitable, particularly primary amines of ring systems capable of being vatted.

The reaction probably takes place in such a manner that the amino group reacts while splitting off hydrogen with the anthraquinone nucleus in a position which is adjacent to the annexed ring. So the condensation product of 1,2-benzanthrene-7,12-dione and 1-aminoanthraquinone corresponds probably with the following formula:

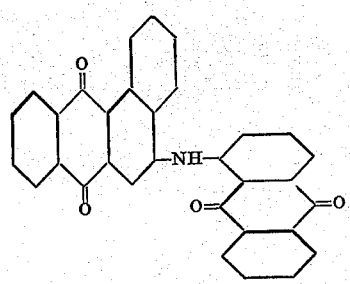

The condensation products are valuable intermediates for the production of dyestuffs, particularly, so far as they contain the radicle of a vattable amine, they are dyestuffs themselves of a good tinctorial power and a good fastness.

In order to further illustrate our invention the following examples are given, the parts being by weight and all temperatures in centigrade degrees; but we wish it however to be understood that our invention is not limited to the examples given, nor to the exact conditions stated therein.

Example 1

A mixture of 15 parts of 1,2-benzanthrene-7,12-dione, 10 parts of 4-toluidine, about 20 parts of caustic potash and about 70 parts of pyridine is stirred for about 3 hours at room temperature. Then the reaction mass is poured on dilute hydrochloric acid and the separated reaction product may be extracted by boiling methylalcohol. It corresponds to the formula

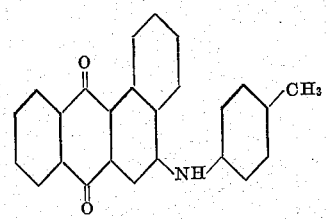

and is when dry a red substance, soluble in concentrated sulfuric acid with an olive color and dyeing cotton from an orange reddish vat pink shades.

Example 2

A mixture of 10 parts of 1,2-benzanthrene-7,12-dione, 10 parts of 1-amino-5-benzoylamino-anthraquinone, 25 parts of powdered caustic potash and about 150 parts of pyridine is stirred for about 4 hours at 50 to 60° C. Then the formed potassium salt separates. It is filtered off, washed out and poured on dilute hydrochloric acid. The condensation product of the formula:

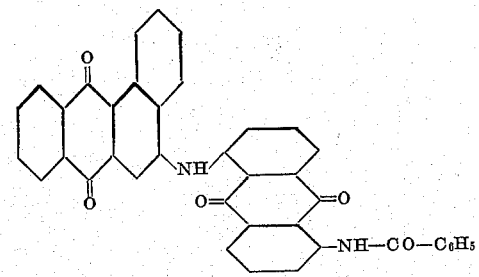

is when dry a reddish brown powder crystallizable from nitro-benzene and soluble in concentrated sulfuric acid with an olive-green color which turns to bluish green when adding paraformaldehyde.

Example 3

10 parts of 1,2-benzanthrene-7,12-dione are mixed with 10 parts of 1-amino-4-benzoylamino-anthraquinone, 30 parts of powdered caustic potash and about 100 parts of pyridine and the mixture is stirred for about 20 hours at room temperature. The reaction product is isolated as described above. It crystallizes from highly boiling organic solvents in the form of dark violet crystals soluble in concentrated sulfuric acid with an olive green color. It dyes cotton from a reddish brown vat slight violet shades. It is identical with the product obtainable in the known manner by decomposing 3-chloro-1,2-benzanthrene-7,12-dione with 1-amino-4-benzoylaminoanthraquinone. It corresponds to the formula:

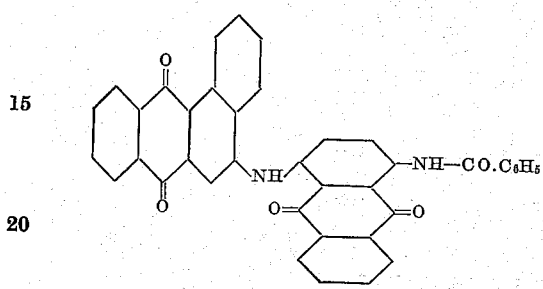

When replacing in the above mixture the caustic potash by 40 parts of powdered sodium-amide and milling the mixture for about 20 hours in a ball mill the same product is obtained, which may be purified by extraction with alcohol and recrystallization from nitrobenzene.

When using as one reaction component 1-aminoanthraquinone (instead of 1-amino-4-benzoylaminoanthraquinone), the formed condensation product crystallizes from chlorobenzene as a violetish red crystalline powder, soluble in concentrated sulfuric acid with an olive green color turning to bluish green when adding paraformaldehyde. It is identical with the product, obtainable by condensing 3-chloro-1,2-benzanthrene-7,12-dione with 1-aminoanthraquinone.

We claim:

A process for producing condensation products of the anthraquinone series which comprises acting in a basic organic solvent and in the presence of strong alkaline acting condensing agents with primary amines of the benzene, naphthalene and anthraquinone series on 1,2-benzanthrene-7,12-diones.

HEINZ SCHEYER.
EMIL SCHWAMBERGER.